United States Patent [19]

Stohs

[11] Patent Number: 4,704,641

[45] Date of Patent: Nov. 3, 1987

[54] RECOVERY OF STORED DATA FROM MUTILATED TAPE DATA BLOCKS

[75] Inventor: Norbert E. Stohs, Batavia, Ill.

[73] Assignee: American Telephone and Telegraph Company, AT&T Bell Laboratories, Murray Hill, N.J.

[21] Appl. No.: 722,656

[22] Filed: Apr. 12, 1985

[51] Int. Cl.[4] .......................... G11B 5/09; G11B 20/18
[52] U.S. Cl. ....................................................... 360/53
[58] Field of Search ................... 360/11.1, 31, 53, 75, 360/83, 90, 134; 369/83, 130, 96; 371/7–13, 65, 37, 38, 72; 364/200, 300

[56] References Cited

U.S. PATENT DOCUMENTS

| 3,261,003 | 7/1966 | Cogar et al. | 340/174.1 |
| 3,579,211 | 5/1971 | Larsen | 340/174.1 |
| 3,771,125 | 11/1973 | Nagahori et al. | 340/146.1 |
| 3,930,234 | 12/1975 | Queisser et al. | 340/172.5 |

FOREIGN PATENT DOCUMENTS

| 1449425 | 7/1969 | Fed. Rep. of Germany . |
| 56-101680 | 11/1981 | Japan . |
| 58-177507 | 1/1984 | Japan . |

OTHER PUBLICATIONS

J. W. Irwin, "Recovery From Write Check Conditions", *IBM Technical Disclosure Bulletin*, vol. 15, No. 9, Feb. 1973, pp. 2946–2947.

*Primary Examiner*—Gareth D. Shaw
*Assistant Examiner*—Paul Kulik
*Attorney, Agent, or Firm*—David Volejnicek

[57] ABSTRACT

Disclosed is a tape controller (105) that recovers data from a block (203b) of data stored on magnetic tape (109) that has been affected in part by uncorrectable errors such as tape blemishes (213). Upon receiving a request for the block of data, the controller causes a tape drive (108) to read the block from the tape. The controller stores the read data in a buffer memory (111) that is at least the size of the data block. When the tape drive encounters the affected data while reading the block of data, the controller clears the buffer memory and causes the drive to read the block in reverse. The controller again stores the read data in the buffer memory, in the order in which they are read. When the drive again encounters the affected data, the controller reverses the contents of the buffer memory and then causes the drive to read the block in forward. The controller once more stores the read data in the buffer memory, thereby concatenating the two data portions. When the drive again encounters the affected data, the controller provides the contents of the buffer memory to a requestor in response to a request for the block of data.

16 Claims, 9 Drawing Figures

RECOVERY OF STORED DATA FROM MUTILATED TAPE DATA BLOCKS

TECHNICAL FIELD

This invention relates to handling of defects in reel storage media, and particularly concerns a method of and apparatus for recovering from media, such as magnetic tape, stored blocks of data that have been affected by uncorrectable defects, such as tape blemishes.

BACKGROUND OF THE INVENTION

Magnetic tape is a commonly used storage medium in processing systems. It is used particularly for relatively long-term storage of bulk data. For example, tape is commonly used to store back-up copies of computer operating systems, or customer billing data of telephone offices. Such data is non-transitory and hence is commonly stored on the tape for long periods of time, i.e., days, months, or years. During such long periods of use and handling, it is not unusual for the tape to get damaged. The damage may result in the mutilation of the stored data, causing errors that cannot be corrected by error correction techniques that are commonly employed to detect and correct minor errors in data items. Examples of such error correction techniques are parity bits, cyclic redundancy code (CRC), and Hamming error correction code. Such codes are appended to each data item, for example to each data byte. They are generally useful for detection of even multibit errors in the data item, but seldom allow for more than single or double bit error correction in such item. But damage to tape such as a scratch, a crinkle, a tear, or a smudge of dirt is likely to mutilate more than one data item and more than one or two bits of each of those items, and hence causes uncorrectable errors.

Techniques exist for detecting and avoiding tape blemishes that are present at the time that data is being stored on the tape. These techniques generally do not write on those portions of the tape that are detected to be blemished. These techniques skip over the blemished areas and store all data on those portions of tape that are detected to be good. Such techniques, however, offer no solution to the problem of how to deal with blemishes—and their consequences—that appear only after data has been stored on the tape.

For purposes of data storage on tape, data is commonly grouped into blocks of data items. A block may comprise, for example, a thousand bytes of data. Individual data blocks are delineated on tape, for example by being separated by headers and trailers or by blank portions of tape. When a portion of a data block develops an uncorrectable error, it is a common practice to treat the whole block as being mutilated and hence to consider all of its information content to be lost. In response to a request for retrieval of such a data block, the retrieval mechanism commonly returns no data, only a message indicating that the block is bad.

In many applications, such as telephone billing data storage, this approach results in the loss of a whole block of information that cannot easily be obtained from any other source. Hence, it is desirable to be able to recover as much of the good data from the mutilated data block as possible. But the current common practice does not satisfy this need.

Furthermore, current implementations of the retrieval mechanism are not suited for satisfying this need. Having begun to retrieve a block, the retrieval mechanism detects where valid data ends and mutilated data begins, but thereafter the mechanism has no means of detecting where mutilated data ends and valid data begins. Only when it encounters the end of the block does the mechanism regain the ability to distinguish valid from mutilated data.

SUMMARY OF THE INVENTION

The invention is directed to overcoming these and other disadvantages of the prior art. According to the invention, there is provided an apparatus for, and a method of, recovering from a reel storage medium a block of stored data some of which is affected by an error. The apparatus comprises an arrangement for retrieving from the medium both block data stored to one side of the affected data and block data stored to the other side of the affected data, and an arrangement for concatenating the retrieved data that was stored to the one side with the retrieved data that was stored to the other side, in order to derive usable data from the block of data. The block's data are stored side by side on the medium. The retrieving arrangement firstly retrieves from the medium the block's data that are stored on the one side of the affected data, until it encounters the affected data. In response to encountering the affected data, it secondly retrieves from the medium the block's data that are stored on the other side of the affected data, until it encounters again the affected data.

In an analogous vein, the method comprises the steps of firstly retrieving from the medium the block data that are stored to one side of the affected data, secondly retrieving from the tape the block data that are stored to another side of the affected data, and concatenating the firstly-retrieved data with the secondly-retrieved data, to derive usable data from the block of data. Data that are stored on the one side of the affected data are firstly retrieved until the affected data are encountered; similarly, other data that are stored on the other side of the affected data are secondly retrieved until the affected data are encountered again.

The described method and apparatus enable the recovery of potentially as much data as is possible from a data block affected by an uncorrectable error. Data lying to both sides of a blemish are recovered, and only data lying within the bounds of the blemish are lost. No longer is the whole block of data lost merely because a part of it is afflicted with an uncorrectable error. Hence, the amount of damage caused by such an error is reduced.

Preferably, retrieval of the block's data always begins at an end of the block and continues until the affected data are encountered. Hence, the retrieval arrangement comprises an arrangement for reading data from one end of the block until it encounters the affected data, and thereafter for reading data from the other end of the block until it again encounters the affected data. The concatenating arrangement preferably includes an arrangement for reversing the order of the data read from one or the other end of the block, to place all retrieved data in the same order. The preferred method steps are the described functions of these arrangements. For ease of manipulation of the retrieved data, the data are firstly retrieved beginning at the tail end of the block, and only secondly are data retrieved beginning at the head end of the block.

Data retrieval involves reading the data from the medium and storing the retrieved data in a storage arrangement, such as a buffer memory. Again, for ease of manipulation, read data are always stored at the head end of the buffer memory in the order in which they are read. Following their storage in the buffer memory, the firstly-read storage data are moved from the head end to the tail end of the buffer and their order is reversed. Thereby the head end of the buffer is freed for storage of the secondly-read data, and the firstly-read data are placed in proper order for being appended to the secondly-read data.

A specific exemplary embodiment of the invention is a tape controller arranged to derive usable data from a block of data that have been affected by an uncorrectable error. The tape drive is for use in an input and output portion of a processing system that includes an input and output processor, the tape controller included in the processor, a tape drive, and a tape bus connecting the tape drive with the tape controller. The tape controller transfers data to and from the tape drive in response to receipt of commands from the input and output processor. The tape controller includes a buffer memory and a programmed arrangement for recovering from a tape manipulated by the tape drive a block of ordered data stored side by side on the tape. A first program element of the programmed arrangement responds to receipt of a command from the input and output processor requesting retrieval of a block of data from the tape and causes the tape drive to read from the tape the block's data in order beginning at the head end of the block. Another program element responds to receipt from the tape drive of each datum read by the tape drive and accompanied by an indication that the datum is unaffected by an uncorrectable error, and stores the received datum at the head end of the buffer in the order of receipt of the data. Two program elements respond to receipt from the tape drive of indication that a datum read by the tape drive in response to the first program element is affected by an uncorrectable error: one element clears the buffer, and a second element causes the tape drive to read from the tape the block's data in order beginning at the tail end of the block. Two program elements also respond to receipt from the tape drive of indication that a datum read by the tape drive in response to the second element is affected by an uncorrectable error: one element causes the data that are stored at the head end of the buffer to be moved and stored at the tail end of the buffer in reverse order from that in which they were stored at the head end of the buffer, and the other—a third causing element—causes the tape drive to read from the tape the block's data in order beginning at the head end of the block. Finally, a program element responds to receipt from the tape drive of an indication that a datum read by the tape drive in response to the third causing element is affected by an uncorrectable error and signals the input and output processor that the command has been partially successfully completed.

Because the invention largely takes advantage of existing capabilities of conventional tape storage systems, such as the physical capability of a tape drive to read a tape forward or backward, and the capability of a tape controller to store and manipulate in its buffer memory the data read by the tape drive, the invention may easily and inexpensively be implemented in conventional tape storage systems. Moreover, the invention does not affect the conventional operation of tape storage systems in storing data on tape, and in retrieving data from tape when no uncorrectable errors afflict the data. Hence, implementation of the invention may generally be easily retrofitted on existing tape storage systems.

These and other advantages and features of the present invention will become apparent from the following description of an illustrative embodiment of the invention, taken together with the drawing.

DETAILED DESCRIPTION

Figure 1:
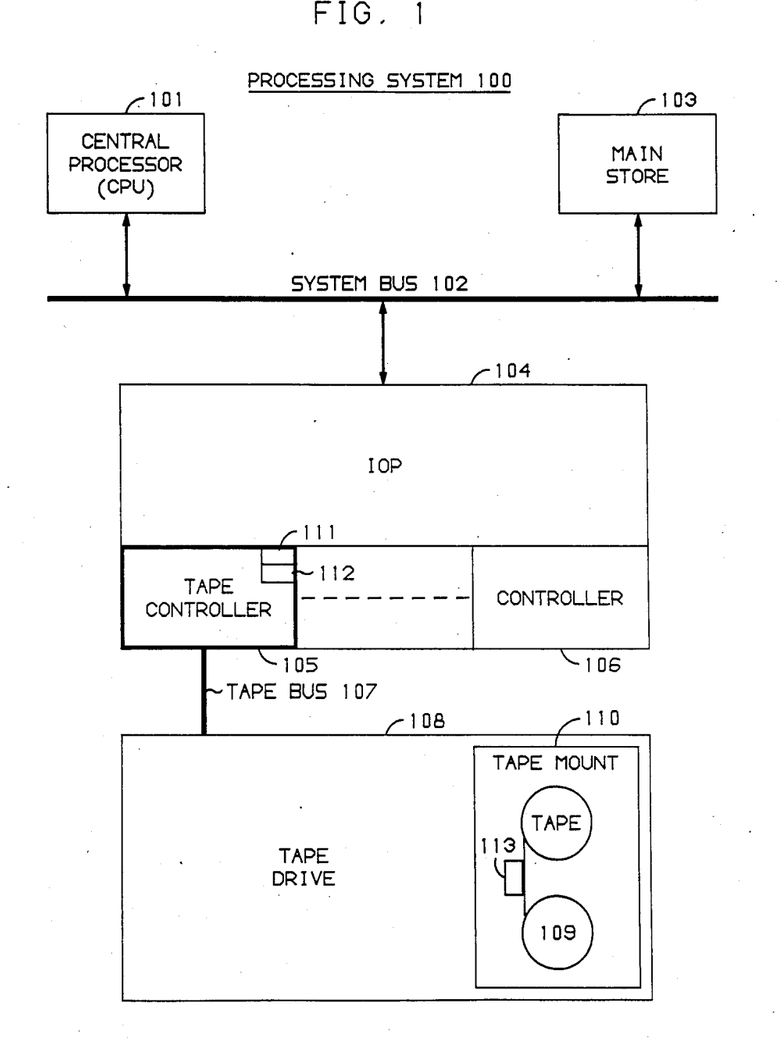
FIG. 1 is a block diagram of a processing system embodying an illustrative example of the invention.

Referring now to the drawing, FIG. 1 shows an illustrative processing system 100. The system includes a central processor (CPU) 101 which carries out the processing activities of the system 100 by executing programs on data, and a main store 103 which is the main online memory of the system and stores at least some of the programs that the CPU 101 executes, data that the CPU 101 operates on, and results of the CPU's operations. Henceforth, all such information will be referred to as data. The CPU 101 and the main store 103 are interconnected by a system bus 102, which is a communications highway that gives the CPU 101 access to the main store 103.

Also connected to the system bus 102 is an input and output processor (IOP) 104 which facilitates communications between peripheral devices of the system 100, such as a tape drive 108, and the CPU 101 and the main store 103. In particular, the IOP 104 responds to CPU 101 commands to perform direct memory access (DMA) transfers of data between the main store 103 and peripheral devices.

The IOP 104 includes a plurality of controllers 105-106, each for facilitating communications with a particular peripheral device. Included among the controllers 105-106 is the tape controller 105 which facilitates communications with a tape drive 108. The controller 105 includes a buffer memory 111 for temporarily storing a block of data being transferred to and from the tape drive 108, and a control memory 112 holding controller programs and other information necessary for proper communications with, and control of, the drive 108. The controller 105 and drive 108 are interconnected for communications by a tape bus 107.

The tape drive 108 is an apparatus that handles the storage and retrieval of data on storage tape 109. For this purpose, the drive has a tape mount 110 on which the tape is mounted and which includes tape heads 113 for reading and writing the data, and motors (not shown) for moving the tape past the heads 113. The system as described so far is conventional.

Figure 2:
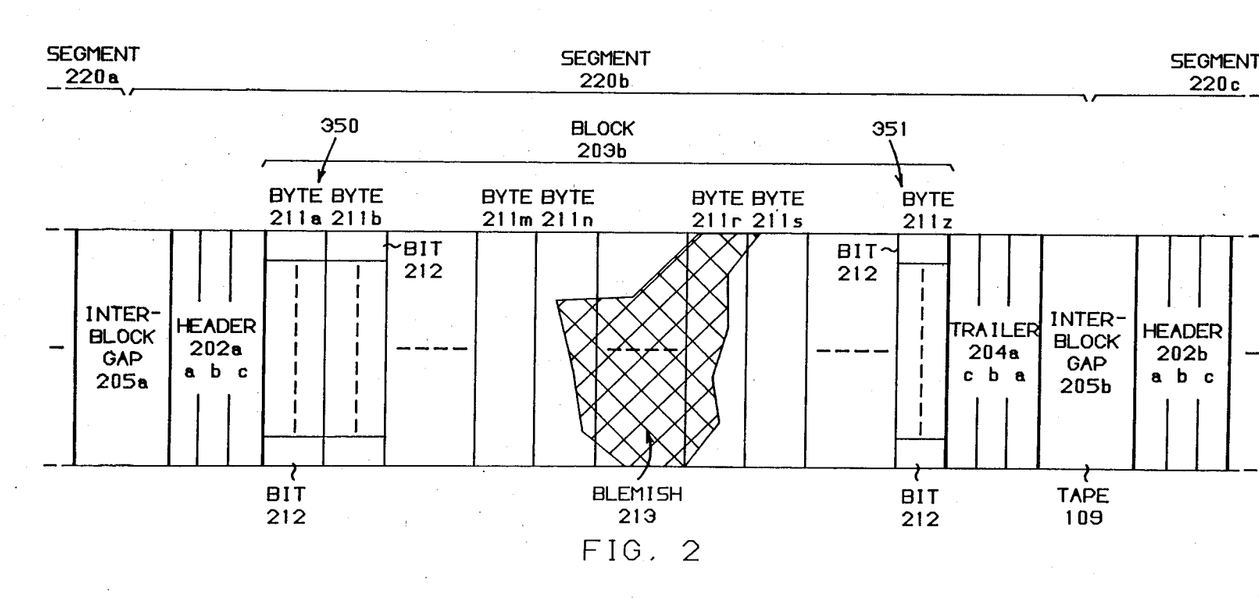
FIG. 2 is a diagram of the layout of a segment of tape of the system of FIG. 1.

Turning to FIG. 2, there is shown a portion of the tape 109. The figure illustrates the manner in which data stored on the tape 109 is organized. The tape 109 is logically subdivided into a plurality of adjacent segments 220, each of which stores a block 203 of data. FIG. 2 shows in detail a segment 220b which stores a data block 203b. Adjacent blocks 203 are physically separated from each other by headers 202, trailers 204, and interblock gaps 205. A header 202 is a predetermined code (illustratively indicated to be "abc" in FIG. 2) which indicates the beginning of a data block 203. A trailer 204 is also a predetermined code, and, in this example, is the mirror image of header 202 (hence indicated to be "cba" in FIG. 2). A trailer 204 indicates the end of a data block 203. Separating the trailer 204 of one block 203 and the header 202 of an adjacent block 203 is an interblock gap 205. The interblock gap 205 spans the ends of adjacent segments 220, and a part of the gap 205 may be considered to lie in each of the adjacent segments 220.

The data block 203b, representative of all of the data blocks 203, comprises a plurality data items stored side by side. In this example, each data item, or datum, is a byte, and the block 203b is shown to comprise bytes 211a–211z. Commonly, a block 203 comprises 500 or 1000 bytes 211. Each byte 211 comprises a plurality of bits 212. In this example, each byte 211 has 9 bits: 8 bits of data and 1 bit of parity for error correction of the 8 data bits. Though the parity bit is useful in correcting only single-bit errors in a byte, it can also identify plural-bit errors in the byte. The 9 bits 212 of each byte 211 are stored in parallel, across the width of the tape 109, i.e., in 9 channels. The data bytes 211 are ordered, i.e., which byte 211 is adjacent to which other byte 211, and the sequence in which the individual bytes 211 are stored, is important.

As illustrated in FIG. 2, the segment 220b of the tape 109 is marred by a blemish 213. The blemish 213 has mutilated a part of the block 203b, in particular the bytes 211n–211r. As illustrated, the blemish 213 has destroyed a plurality of bits 212 of each of the bytes 211n–211r. Hence, the parity bit cannot be used to rectify this problem and the bytes 211n–211r are afflicted with an uncorrectable error, also referred to as a hard error. However, the front part of the block 203b, comprising bytes 211a–211m, and the back part of the block 203b, comprising bytes 211s–211z, have not been uncorrectably affected by the blemish 213, and hence they retain their informational content.

The operation of the system 100 will be considered next. The system 100 stores a block of data on the tape 109 in the conventional manner. Likewise, the system 100 retrieves a stored block of data from the tape 109 in the conventional manner, if the block is not afflicted with an uncorrectable error. If the block is affected by an uncorrectable error, the retrieval operation proceeds conventionally until the uncorrectable error is encountered; thereafter, the retrieval operation begins to differ from the conventional manner of response to the error.

To illustrate how a block that is affected by an uncorrectable error is handled in the system 100, assume that the tape 109 is stopped and the tape heads 113 (see FIG. 1) are positioned over the interblock gap 205a of FIG. 2. To retrieve the block 203b from the tape 109, the CPU 101 issues a command to the IOP 104 requesting that the block 203b be transferred from the tape 109 to the main store 103. The command specifies certain parameters, inter alia, the starting address in the main store 103 of a block of memory locations in which the block 203b is to be stored and the size, in number of bytes, of the block 203b. The IOP 104 passes the request for the block, along with parameters that are relevant to the operation of the controller 105, to the controller 105.

Figure 3:
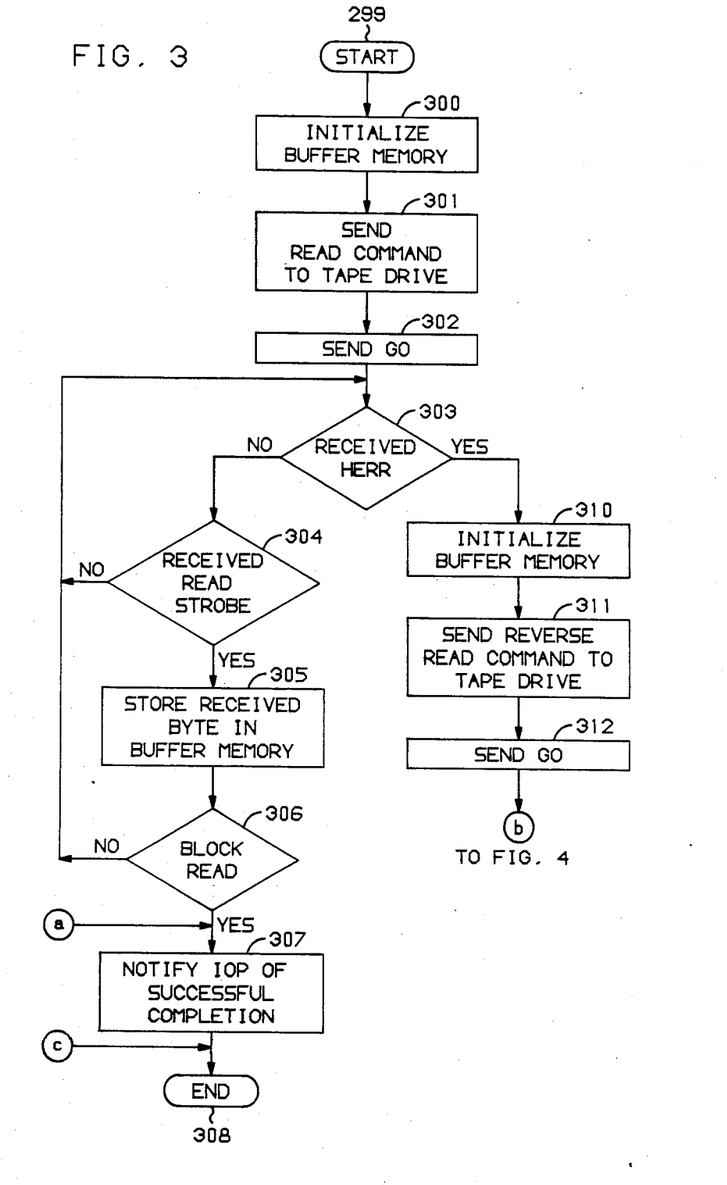
FIGS. 3 and 4 are a flow diagram of the operation of the tape controller of the system of FIG. 1.
Figure 4:
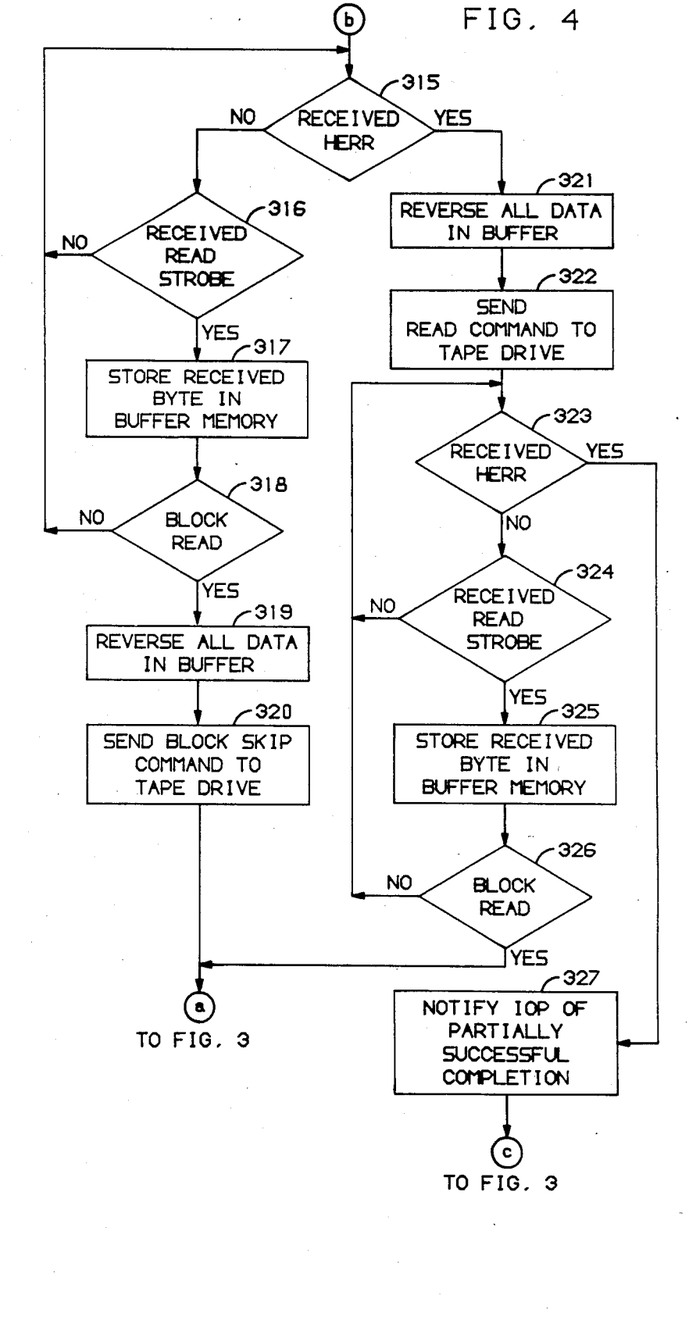

In response, the controller 105 executes an appropriate program, stored in its control memory 112, that directs the actions of the tape drive 108 and the cooperation of the controller 105 therewith. A high-level flowchart of the controller program is presented in FIGS. 3 and 4. Upon beginning to execute, at box 299, the controller 105 initializes its buffer memory 111, as indicated in box 300. This involves, for example, discarding from the memory 111 any previous contents and setting a buffer memory write pointer (not shown) to point to the first empty storage location 401a of the buffer memory 111 (see FIG. 5). The controller 105 then sets control lines of the tape bus 107 to the appropriate state, thereby to direct the actions of the tape drive 108 appropriate in retrieving the block data from the tape 109. Inter alia, the tape drive 108 is thus given a READ command. This is indicated in box 301. The controller 105 then sends a GO command to the drive 108, as indicated in box 302, to cause the drive 108 to commence the READ operation.

Before receipt of the GO command, the tape 109 is stopped and the tape heads 113 are positioned in the interblock gap 205a. Receipt of the GO command causes the drive 108 to start the tape 109 moving in the forward direction past the tape heads 113. As the tape heads 113 pass over the segment 220b, they read information that is stored thereon. Because the tape 109 is moving in the forward direction, the heads 113 first read the header 202a and then begin to read block data from the head end 350 of the block 203b, starting with the byte 211a. The heads 113 send the retrieved information to other circuitry of the tape drive 108. That circuitry recognizes and discards the header 202a and then performs error checking and correction on each retrieved byte 211 of the block 203b. The circuitry sends each consecutive valid byte 211 accompanied by a READ STROBE signal over the tape bus 107 to the controller 105.

The controller 105 is awaiting receipt of either a hard error (HERR) or READ STROBE signal, as indicated in boxes 303 and 304, respectively. The controller 105 responds to receipt of each READ STROBE signal by taking the accompanying byte 211 from the bus 107 and storing it in a location 401 of its buffer memory 111, as indicated in box 305. Consecutive bytes 211 are stored in the order in which they are read, in consecutive buffer memory locations 401 starting at the front, or head end 450 (see FIG. 5), of the buffer memory 111. The controller 105 then checks for a BLOCK READ signal from the drive 108 indicating that it has completed reading the block 203b, as indicated in box 306. The drive 108 generates this signal when it encounters a trailer 204 and thus determines that the byte it has just read and sent to the controller 105 is the last byte 211 at the tail end 351 of a block 203. When the controller 105 does not receive the BLOCK READ signal, the controller 105 returns to box 303 to await receipt of a HERR or another READ STROBE signal.

The tape drive 108 reads and sends to the controller 105, and the controller stores in the buffer memory 111, consecutive bytes 211 of the block 203b, beginning with the byte 211a from the head end 350 of the block 203b. Had the blemish 213 not been present, the drive 108 would have retrieved, and the controller 105 would have stored, all bytes 211a–211z of the block 203b. Upon retrieving the byte 211z and determining from the presence of the trailer 204a that it has retrieved the whole block 203, the drive 108 would have sent a BLOCK READ signal to the controller 105 and stopped the tape 109, positioning the heads 113 over the interblock gap 205b.

In response to receipt of the BLOCK READ signal at box 306, the controller 105 would have notified other IOP circuitry of successful completion of retrieval of the block 203b, and would have terminated its operation, as is conventional and shown in boxes 307 and 308.

However, because the blemish 213 is present, when the tape drive 108 encounters the byte 211n, it determines that the byte 211n is affected by a hard error. The tape drive 108 therefore generates and sends a HERR signal to the controller 105. The drive 108 then stops sending the READ STROBE signals, but continues to move the tape 109 under the heads 113 until the drive 108 detects the trailer 204a. The drive 108 then stops the tape 109, which comes to rest with the heads 113 positioned over the interblock gap 205b.

When the controller 105 receives the HERR signal, at box 303, it responds by initializing again the buffer memory 111, as indicated in box 310. The buffer memory 111 currently contains the block data that is stored on the tape 109 to one side of the affected data; the initialization has the effect of discarding from the buffer memory 111 all current contents. The controller 105 then sends a REVERSE READ command followed by a GO command to the tape drive 108, as indicated in boxes 311 and 312.

The drive 108 responds to these commands in the same manner as it did to the READ and GO commands given in boxes 301 and 302, except that now it moves the tape 109 in the reverse direction. Hence, the circuitry of the drive 108 now reads the segment 220b in reverse. Because the tape 109 is moving in reverse, the heads 113 first read the trailer 204a and then begin to read block data from the tail end 351 of the block 203b, starting with the byte 211z. The circuitry of the drive 108 interprets the trailer 204a as a header 202, discards it, and sends to the controller 105 consecutive bytes 211 of block 203b beginning with the byte 211z and progressing toward the head end 350 of the block 203b.

It is possible for a blemish to adversely affect the reading of a tape in one direction only. Assuming that that is the case, the tape drive 108 does not detect a hard error when reading the block 203b in reverse. The tape drive 108 retrieves and sends to the controller 105 all bytes 211z-211a. The controller 105 follows the same procedure as it did in boxes 303-306 and stores the bytes 211z-211a in the buffer memory 111, as indicated in boxes 315-318. After retrieving the byte 211a and determining from the presence of the header 202a (interpreted by the drive 108 as a trailer 204) that the byte 211a is the first byte 211 at the head end 350 of the block 203b, the drive 108 knows that it has retrieved the whole block 203b. Hence the drive 108 sends a BLOCK READ signal to the controller 105 and stops the tape 109, positioning the heads 113 over the interblock gap 205a.

Figure 5:
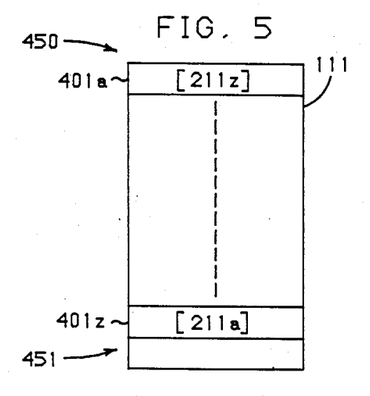
FIGS. 5 through 9 are block diagrams of layouts of the tape controller buffer memory of the system of FIG. 1.
Figure 6:
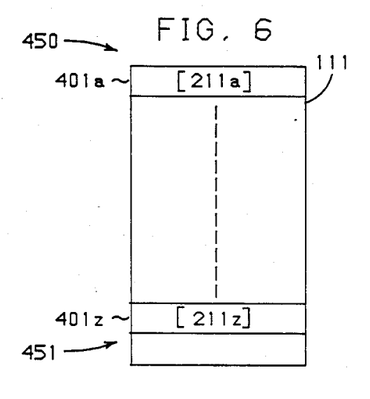

At this point, the contents of the buffer 111 are as shown in FIG. 5. The buffer 111 stores all of the bytes 211z-211a of the block 203b in the reverse order in which they were received by the controller 105. Hence, in response to receipt of the BLOCK READ signal at the box 318, the control 105 reverses the order of the bytes 211z-211a in the buffer 111, as indicated in box 319, to cause the bytes 211 to become stored therein in the right order, as shown in FIG. 6. From the block byte count that it had received as part of the original request for the block 203b, the controller 105 knows that the block 203b has z bytes. Hence the controller 105 treats the memory location 401z as marking the tail end 451 of the buffer memory 111 and manipulates only the contents of the locations 401a-401z in reversing the order of the bytes 211 in the buffer memory 111. The controller 105 reverses the order of the bytes 211 by swapping contents of the locations 401a and 401z, swapping contents of locations 401b and 401y, and so on.

Whereas following a normal, forward, read the heads 113 would be positioned over the interblock gap 205b, now they are positioned over the interblock gap 205a. Hence the controller 105 sends a BLOCK SKIP command to the drive 108, as indicated in box 320. The drive 108 responds by positioning the heads 113 over the gap 205b. The controller 105 then notifies IOP circuitry of successful completion of retrieval of the block 203b, and terminates its operation, as shown in the boxes 307 and 308.

Assuming that the blemish 213 affects reading of the block 203b in either direction, following receipt of the REVERSE READ and GO commands at the boxes 311 and 312 the tape drive 108 retrieves and sends to the controller 105 the bytes 211z-211s of the block 203b. The controller 105 follows the same procedure as it did in boxes 303-306 and stores the bytes 211z-211s in the buffer memory 111, as indicated in boxes 315-318. When the tape drive 108 encounters byte 211r, it determines that the byte is affected by a hard error. The tape drive 108 therefore generates and sends a HERR signal to the control 105. The drive 108 then stops sending the READ STROBE signals but continues to move the tape 109 under the heads 113 until the drive 108 detects the header 202a. The drive 108 then stops the tape 109, which comes to rest with the heads 113 positioned over the interblock gap 205a.

Figure 7:
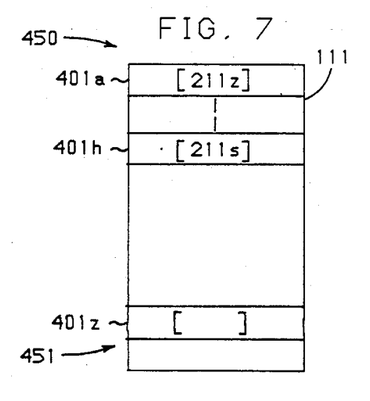
Figure 8:
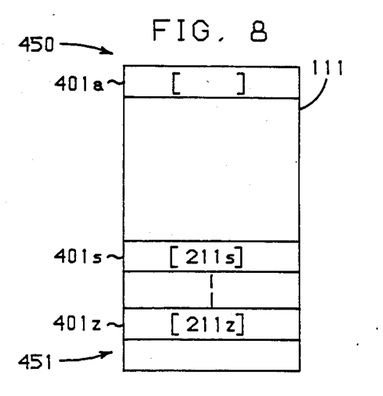

At this point, the buffer memory 111 contains the block data that were stored on tape 109 to one side of the block data that are uncorrectably affected by the blemish 213. The contents of the buffer memory 111 are as shown in FIG. 7. The buffer memory 111 contains the bytes 211z-211s of the block 203b stored in reverse order at the head end 450, in locations 401a to 401h. When the controller 105 receives the HERR signal, at box 315, it responds by swapping the contents of the buffer locations 401a-401z, in the manner described above, to reverse the order of the bytes 211z-211s in the buffer 111 and to store the bytes 211s-211z at the tail end 451, in locations 401s to 401z, as indicated in box 321 and shown in FIG. 8.

Next, the controller 105 sends a READ command to the drive 108, as indicated in box 322, to cause it to read the block 203b in the manner described for box 301. The controller 105 then follows the same procedure as it had in boxes 303-306 to store bytes 211 received from the drive 108 in the buffer memory 111, as indicated in boxes 323-326.

If, for some reason, the blemish 213 were not to affect this attempt at reading the block 203b, the drive 108 would retrieve and send to the controller 105, and the controller 105 would store, all bytes 211a-211z of the block 203b. Upon receipt of the BLOCK READ signal at box 326, the controller 105 would simply notify other IOP circuitry of successful completion of retrieval of the block 203b and then end its operation, as indicated by the boxes 307-308. If, however, as is more likely, the blemish 213 again affects the forward reading of the block 203b, the drive 108 retrieves and sends to the controller 105, and the controller 105 stores in the buffer 211, bytes 211a-211m of the block 203b. These bytes are block data that are stored on tape 109 to one side of the block data that are uncorrectably affected by the blemish 213. When the drive 108 encounters the byte 211n and again detects a hard error, it sends a HERR signal to the controller 105, stops sending the READ STOBE signals, and positions the heads 113 over the interblock gap 205b, in the manner described above.

Figure 9:
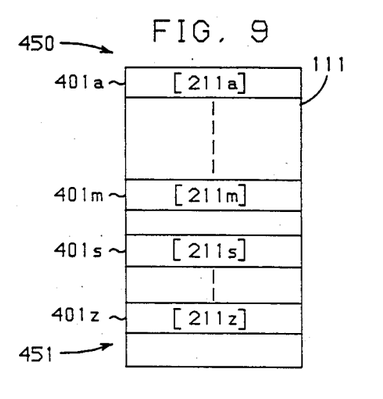

When the controller 105 receives the HERR signal at box 323, the contents of the buffer memory 211 are as shown in FIG. 9. The buffer memory 211 contains the bytes 211a–211m, stored in order at the head end 450, then has the initialized buffer memory contents in buffer locations 401n–401r that would generally store the bytes 211n–211r, and then contains the bytes 211s–211z stored in order at the tail end 450. Hence the buffer memory 111 contains those portions of the block 203b that are valid and could be recovered in spite of the effect of the blemish 213. Moreover, the bytes 211 that are stored on tape 109 to one side of the affected bytes 211 are concatenated in the buffer memory 111 with the bytes 211 that are stored on the other side of the affected bytes 211: the two parts of the block 203b are joined together in the proper order, with the part from the tail end 351 appended to the part from the head end 350, and all bytes 211 are in order and in proper relative position with respect to one another. The controller 105 can do no more. Consequently, upon receipt of the HERR signal at box 323, the controller 105 notifies other IOP circuitry of partially successful completion of retrieval of the block 203b, as shown in box 327, and then terminates its operation, at box 308. The controller 105 thus provides the contents of its buffer memory 111 to the IOP circuitry in partial satisfaction of the original request for the block 203b.

The IOP 104 responds to the notification by making a DMA transfer of the contents of the buffer 211 into the main store 103, and then sends a message to the CPU 101 to notify it of a partially successful retrieval of the block 203b. The retrieval operation is thereby completed.

Of course, various changes and modifications to the illustrative embodiment described above will be apparent to those skilled in the art. For example, the invention may be applied to storage media other than magnetic tape, such as paper tape. Or the head-end portion of the block may be retrieved before the tail-end portion of the block is retrieved. Furthermore, the disclosed embodiment is equally-well suited for retrieval of blocks whose head end or tail end portions are afflicted with an error such that there is no unafflicted block data stored to one side of the afflicted data. Such changes and modifications can be made without departing from the spirit and scope of the invention and without diminishing its attendant advantages. It is therefore intended that such changes and modifications be covered by the following claims.

What is claimed is:

1. Method of recovering from a reel storage medium a block of data which are stored side by side on the medium, some of which data are affected by an error, comprising the steps of:
   firstly retrieving from the medium the block's data that are stored on one side of the affected data, until encountering the affected data;
   secondly retrieving from the medium the block's data that are stored on another side of the affected data, until encountering again the affected data; and
   concatenating the firstly-retrieved data with the secondly-retrieved data, to derive usable data from the block of data.

2. The method of claim 1 wherein
   the step of firstly retrieving comprises the step of
   firstly reading from the medium and storing the block's data beginning at one end of the block and continuing until encountering the affected data; and wherein
   the step of secondly retrieving comprises the step of
   secondly reading from the medium and storing the block's data beginning at another end of the block and continuing until encountering the affected data.

3. The method of claim 2 wherein the step of concatenating comprises the step of:
   reversing order of one of the firstly and secondly read and stored data; and
   appending the reversed data to the other of the firstly and secondly read and stored data.

4. Method of recovering from a reel storage medium a block of ordered data which are stored side by side on the medium, some of which data are affected by an error, the block having a head end and a tail end, comprising the steps of:
   firstly both reading from the medium and storing the block's data in order beginning at the tail end of the block and continuing until encountering the affected data;
   reversing the order of the firstly read and stored data upon encountering the affected data;
   secondly both reading from the medium and storing the block's data in order beginning at the head end of the block and continuing until encountering again the affected data; and
   appending the reversed firstly read and stored data to the secondly read and stored data upon encountering again the affected data, to derive usable data from the block of data.

5. The method of claim 4 wherein the step of firstly both reading and storing is preceded by the steps of:
   both reading from the medium and storing the block's data in order beginning at the head of the block and continuing until encountering the affected data; and
   discarding the read and stored data upon encountering the affected data, in preparation for reading the block of data beginning at the tail end of the block.

6. Method of recovering from storage tape a block of ordered data which are stored side by side on the tape, some of which data are affected by an uncorrectable error, the block having a head end and a tail end, comprising the steps of:
   (1) retrieving from the tape a first unretrieved datum from the tail end of the block;
   (2) determining whether the datum retrieved in step (1) is affected by the error;
   (3) storing the datum retrieved in step (1) in a first empty location at the head end of a buffer memory comprising a plurality of locations and having a head end and a tail end, upon determining in step (2) that the retrieved datum is unaffected by the error;
   (4) repeating the steps (1) through (3) until determining in step (2) that the retrieved datum is affected by the error;
   (5) storing the data that were stored in step (3) in locations at the tail end of the buffer memory, in reverse order from order in which they were stored at the head end of the buffer memory, upon determining in step (2) that the retrieved datum is affected by the error;

(6) retrieving from the tape a first unretrieved datum from the head end of the block;

(7) determining whether the datum retrieved in step (6) is affected by the error;

(8) storing the datum retrieved in step (6) in the first empty location at the head end of the buffer memory, upon determining in step (7) that the retrieved datum is unaffected by the error; and (9) repeating the steps (6) through (8) until determining in step (7) that the retrieved datum is affected by the error;

whereby usable data is derived from the block of data, and the usable data is stored in usable form in the buffer memory.

7. The method of claim 6 wherein
step (4) comprises the steps of
(4a) determining whether the datum retrieved in step (1) is the first datum at the head end of the block, and (4b) repeating the steps (1) through (3) until either determining in step (2) that the retrieved datum is affected by the error or determining in step (4a) that the retrieved datum is the first datum at the head end of the block; wherein step (9) comprises the steps of
(9a) determining whether the datum retrieved in step (6) is the last datum at the tail end of the block, and (9b) repeating the steps (6) through (8) until either determining in step (7) that the retrieved datum is affected by the error or determining in step (9a) that the retrieved datum is the last datum at the tail end of the block; and wherein step (5) comprises the steps of
(5a) storing the data that were stored data in step (3) in locations at the tail end of the buffer memory, in reverse order from the order in which they were stored at the head end of the buffer memory, upon either determining in step (2) that the retrieved datum is affected by the error or determining in steps (2) and (4a) that the retrieved datum is both unaffected by the error and the first datum at the head end of the block, and (5b) after step (5a) skipping steps (6) through (9) upon determining in steps (2) and (4a) that the retrieved datum is both unaffected by the error and the first datum at the head end of the block.

8. The method of claim 7 wherein step (1) is preceded by the steps of;

(11) retrieving from the tape a first unretrieved datum from the head end of the block;

(12) determining whether the datum retrieved in step (11) if affected by the error;

(13) storing the datum retrieved in step (11) in the first empty location at the head end of the buffer memory, upon determining in step (12) that the retrieved datum is unaffected by the error;

(14) repeating the steps (11) through (13) until determining in step (12) that the retrieved datum is affected by the error; and (15) discarding contents of the buffer memory, upon determining in step (12) that the retrieved datum is affected by the error, in preparation for retrieving data from the block beginning at the tail end of the block.

9. Apparatus for recovering from a reel storage medium a block of data which are stored side by side on the medium, some of which data are affected by an error, comprising:

means firstly for retrieving from the medium the block's data stored on one side of the affected data until encountering the affected data, and secondly for retrieving from the medium the block's data stored on another side of the affected data until encountering again the affected data; and means for concatenating the firstly-retrieved data with the secondly-retrieved data, to derive usable data from the block of data.

10. The apparatus of claim 9 wherein the means for retrieving comprise:

means firstly for reading from the medium the block's data beginning at one end of the block and continuing until encountering the affected data, and secondly for reading from the medium the block's data beginning at the other end of the block and continuing until encountering the affected data; and means for storing the firstly and secondly read data.

11. The apparatus of claim 9 wherein the concatenating means comprise:

means for reversing order of one of the firstly and secondly read and stored data to append the reversed data to the other of the firstly and secondly read and stored data.

12. A tape controller for recovering from a storage tape manipulated by a tape drive a block of ordered data which are stored side by side on the tape, some of which data are affected by an error, comprising:

a buffer memory;

first means for causing the tape drive to read from the tape the block's data in order beginning at one end of the block and continuing until the tape drive encounters the affected data;

means for detecting that the tape drive has encountered the affected data;

second means responsive to the detecting means for causing the tape drive to read from the tape the block's data in order beginning at another end of the block and continuing until the tape drive encounters the affected data;

means responsive to the detecting means for storing in the buffer memory unaffected data read by the tape drive; and means for reversing in the buffer memory the order of the stored data that was read by the tape drive from one or the other end of the block, to derive usable data from the block of data.

13. The controller of claim 12 for recovering a data block having a head end and a tail end, wherein the buffer memory has a head end and a tail end; wherein the first means comprise means for causing the tape drive to read from the tape the block's data in order beginning at the tail end of the block and continuing until the tape drive encounters the affected data; wherein the means for storing comprise means responsive to the detecting means for storing the unaffected data read by the tape drive at the head end of the buffer memory in the order in which the data are read; wherein the means for reversing the order comprise means, responsive to detection by the detecting means that the tape drive has encountered the affected data while the tape drive is reading from the tail end of the block, for storing the data stored at the head end of the buffer memory at the tail end of the buffer memory in reverse order from the order in which the data were read; and wherein the second means comprise means, responsive to detection by the detecting means that the tape drive has encountered the affected data while the tape drive is reading from the tail end of the block, for causing the tape drive to read from the tape the block's data in order beginning at the head end of the block and continuing until the tape drive encounters the affected data.

14. In a processing system having an input and output portion comprising an input and output processor, a tape drive, a tape controller in the input and output processor, and a tape bus connecting the tape drive with the tape controller, the tape controller responsive to receipt of commands from the input and output processor for transferring data to and from the tape drive, the tape controller including a buffer memory having a head end and a tail end and further including an arrangement for recovering from a tape manipulated by the tape drive a block of ordered data which are stored side by side on the tape and having a head end and a tail end, the arrangement comprising:

first means, responsive to receipt of a command from the input and output processor requesting retrieval of a block of data from the tape, for causing the tape drive to read from the tape the block's data in order beginning at the head end of the block;

means, responsive to receipt from the tape drive of each datum read by the tape drive and accompanied by an indication that the datum is unaffected by an uncorrectable error, for storing the received datum at the head end of the buffer in order of receipt of the data;

means, responsive to receipt from the tape drive of indication that a datum read by the tape drive in response to the first means is affected by an uncorrectable error, for initializing the buffer;

second means, responsive to receipt from the tape drive of the indication that a datum read by the tape drive in response to the first means is affected by an uncorrectable error, for causing the tape drive to read from the tape the block's data in order beginning at the tail end of the block;

means, responsive to receipt from the tape drive of indication that a datum read by the tape drive in response to the second means is affected by an uncorrectable error, for storing the data that are stored at the head end of the buffer at the tail end of the buffer in reverse order from that in which they were stored at the head end of the buffer;

third means, responsive to receipt from the tape drive of the indication that a datum read by the tape drive in response to the second means is affected by an uncorrectable error, for causing the tape drive to read from the tape the block's data in order beginning at the head end of the block; and means, responsive to receipt from the tape drive of an indication that a datum read by the tape drive in response to the third means is affected by an uncorrectable error, for signaling the input and output processor that the command has been partially successfully completed;

whereby usable data from a block of data that is affected in part by an uncorrectable error is derived and made available to the input and output processor.

15. Method of recovering from a storage tape a block of stored data affected in part by an error, comprising the steps of:

firstly retrieving from the tape block data stored to one side of the affected data;

secondly retrieving from the tape block data stored to another side of the affected data; and concatenating the firstly-retrieved data with the secondly-retrieved data to derive usable data from the block of data.

16. Apparatus for recovering from a storage tape a block of stored data affected in part by an error, comprising:

means for retrieving from the tape both block data stored to one side and block data stored to another side of the affected data; and means for concatenating the retrieved data stored to the one side with the retrieved data stored to the other side to derive usable data from the block of data.

* * * * *